Figure 1:
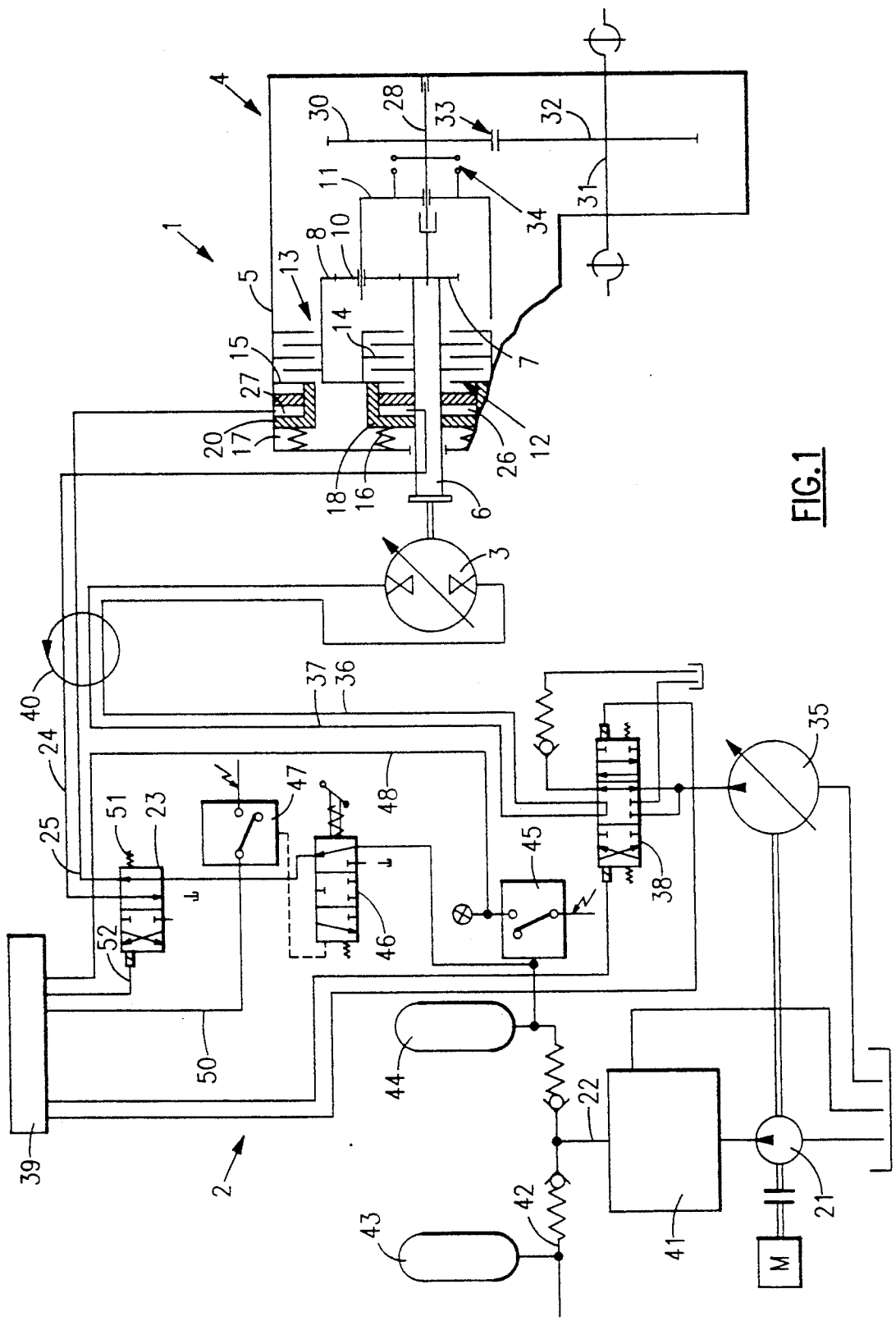

United States Patent [19]

Mann et al.

[11] Patent Number: 5,306,215
[45] Date of Patent: Apr. 26, 1994

[54] DRIVE DEVICE WITH GEARBOX

[75] Inventors: Egon Mann; Helmut Eymüller, both of Friedrichshafen, Fed. Rep. of Germany

[73] Assignee: Zahnradfabrik Friedrichshafen AG, Fed. Rep. of Germany

[21] Appl. No.: 20,172

[22] PCT Filed: Mar. 31, 1990

[86] PCT No.: PCT/EP90/00512

§ 371 Date: Sep. 12, 1991

§ 102(e) Date: Sep. 12, 1991

[87] PCT Pub. No.: WO90/12227

PCT Pub. Date: Oct. 18, 1990

Related U.S. Application Data

[63] Continuation of Ser. No. 761,745, Sep. 12, 1991, abandoned.

[30] Foreign Application Priority Data

Apr. 7, 1989 [DE] Fed. Rep. of Germany ....... 3911333

[51] Int. Cl.⁵ .............................................. F16H 61/12
[52] U.S. Cl. ...................................... 475/83; 475/141
[58] Field of Search ............... 475/31, 76, 80, 81, 475/82, 83, 128, 129, 140, 141, 142, 130, 133, 270, 293, 317

[56] References Cited

U.S. PATENT DOCUMENTS

| | | | |
|---|---|---|---|
| 3,969,957 | 7/1976 | DeLalio | 475/82 X |
| 4,185,520 | 1/1980 | Henneman et al. | 475/141 X |
| 4,407,399 | 10/1983 | Wolff | 475/141 X |
| 4,453,430 | 6/1984 | Sell | 475/83 X |
| 4,516,444 | 5/1985 | Herr, Jr. | 475/141 |

FOREIGN PATENT DOCUMENTS

| | | |
|---|---|---|
| 2110320 | 6/1983 | United Kingdom. |
| 2164397 | 3/1986 | United Kingdom. |
| 84/01419 | 4/1984 | World Int. Prop. O. . |

*Primary Examiner*—Dirk Wright
*Attorney, Agent, or Firm*—Davis, Bujold & Streck

[57] ABSTRACT

A drive device specially used in mobile excavators, wheeled loaders and similar work machines contains a power-shiftable transmission (4) designed as planetary transmission and driven by a hydraulic motor (3). The transmission (4) preferably has two speed levels which are alternatively engageable and disengageable via hydraulically shiftable friction clutches (12, 13). Both friction clutches (12, 13) are designed as spring-accumulator clutches and are controllable by oil pressure generated by an oil pump (21) and both friction clutches (12, 13) are controlled via a gear-shift valve (23). One of the two friction clutches (13) is designed as brake and has a static, leakage-oil-free oil supply. When the oil pressure generated by the oil pump (21) falls below a specific value, the gear-shift valve (23) is engaged into its 2nd-gear position in which only the brake is actuatable with oil pressure. In an emergency where only limited amount of pressurized oil is available, this device makes possible a further operation of the work machine over a certain period of time, since only one clutch that works almost leakage-oil-free is actuated with the pressurized oil.

13 Claims, 2 Drawing Sheets

DRIVE DEVICE WITH GEARBOX

This is a continuation of copending application Ser. No. 07/761,745 filed on Sep. 12, 1991 now abandoned.

The invention concerns a drive device with a power-shiftable transmission driven by a prime mover, specially for mobile excavators, wheeled loaders and similar work machines. The separate speed levels of the transmission are here alternatively engaged and disengaged by a gear-shift valve via a respective friction clutch. At least two of the friction clutches are designed as spring-accumulator clutches and controllable by oil pressure generated by an oil pump. At least one of the friction clutches is designed as brake and has a static, leakage-oil-free oil supply.

Such a drive device is an object of older German patent application P 38 08 067.2. Under different travel conditions, falling below a specific value of the oil pressure generated by the oil pump can lead to deficiencies of the drive of the vehicle. In the 2-gear transmission shown, for instance, the leakage that occurs could make impossible a further forward movement of the vehicle when the pressurized oil that flows is insufficient due, for instance, to an unforeseeable, sudden braking until parking.

Therefore, the problem to be solved by the invention is to improve the drive device so that even when the oil pressure falls the vehicle can still be safely removed from the traffic by its own power and, for instance, driven to the edge of the road. In addition, in case of partial failure of an electric control current, a safe further travel should remain possible.

The drive device of the present invention solves said problem by the fact that when the oil pressure generated by the oil pump falls below a first specific value, the gear-shift valve is adjusted to a position in which only the brake can be actuated with pressurized oil. The oil pressure thus disengages the one of the two friction clutches which has an oil supply fixed to the housing. A brake is provided when a 2-gear transmission is used. In transmissions having more than two gears, more than only one of the friction clutches can be designed as brakes all of which can then be supplied with pressurized oil. Unlike in a friction clutch having one oil supply via a self-turning shaft, none or only a minimal leakage occurs here. The remaining amount of oil such as still conveyed by an oil pump with slipping drive V-belt or existing in a hydraulic accumulator will therefore be capable of keeping the brake disengaged over a specific period of time so that the vehicle can be driven to a safe place.

When using a 2-gear transmission it is convenient if the 2nd gear is engaged upon actuation of the brake with pressurized oil. Thereby a sudden delay which would occur when downshifting from the 2nd gear to the 1st gear is avoided. The engagement of the 2nd gear or of the gear engaged by actuating the brake(s) with pressurized oil when the oil pressure falls is advantageously obtained by attaching to the pressure line, which leads from the oil pump to the gear-shift valve, a pressure switch by which the gear-shift valve is adjusted to the adequate shift position when the oil pressure falls.

In case of complete failure of the oil pump, the required pressure can be maintained over a certain period of time by a hydraulic accumulator attached to the pressure line leading from the oil pump to the friction clutches.

In case of failure of an electric control current, a sudden deceleration can be prevented by adjusting the gear-shift valve to said shift position even in such a case.

If the oil pressure in the pressure line sinks further below to a pressure no longer sufficient to keep the brake disengaged, it is advantageous to brake the prime mover by a second pressure switch. If as prime mover is used a hydraulic motor supplied with pressurized oil by a hydraulic pump via a steering valve, then the steering valve is adjusted by the second pressure switch to its neutral shift position which shuts off a communication from the hydraulic pump to the hydraulic motor.

The invention is not limited to the combination of features of the claims. Depending on the existing problem, other logical possible combinations result for the expert from the claims and individual features of the claims.

Figure 2A:
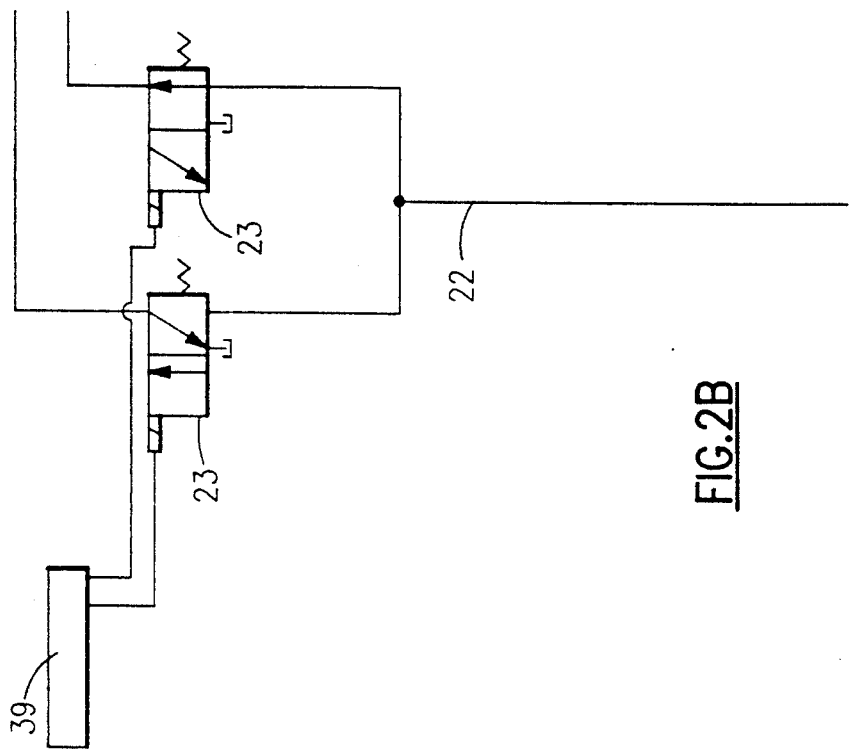
Figure 2B:
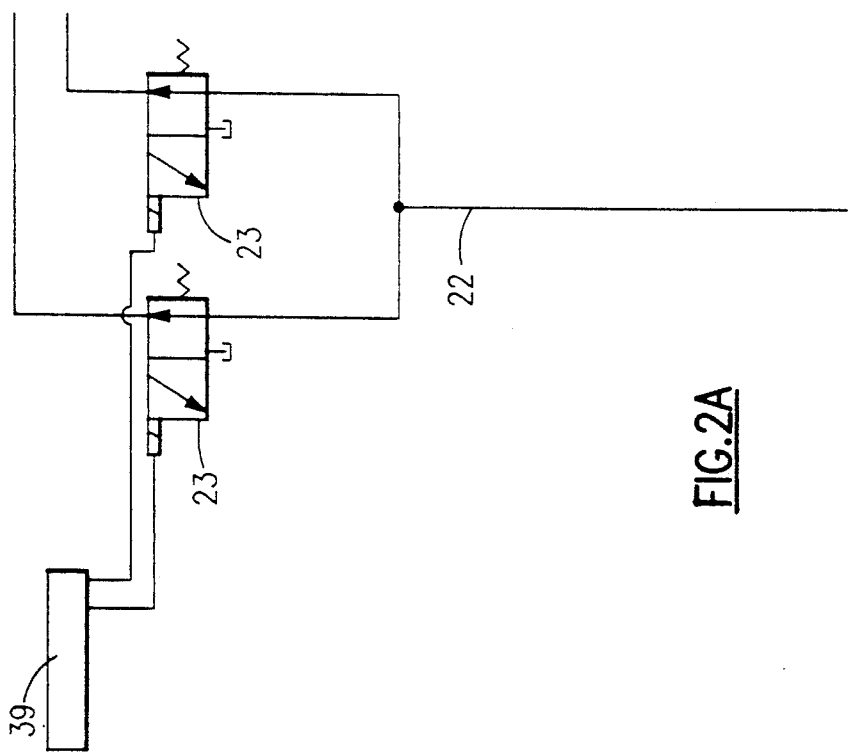

The invention is explained in detail herebelow with reference to three embodiments shown in the drawings. FIG. 1 shows diagrammatically the drive device according to the invention, FIG. 2A shows diagrammatically a second embodiment of the gear-shift valve means, and FIG. 2B shows diagrammatically a third embodiment of the gear-shift valve means.

The drive device essentially consists of a drive component 1 an a control component 2. The drive component 1 contains a hydraulic motor 3 which drives a 2-gear transmission 4. Instead of the hydraulic motor 3, there can be used any prime mover which is designed with infinitely variable speed and torque conversion from the initial zero speed. This can be, for instance, an electromotor. A transmission having more than two shiftable gears likewise can be used.

A 2-gear transmission 4 is designed as power-shiftable planetary transmission. A sun gear 7 is non-rotatably connected with an input shaft 6 in a housing 5. A ring gear 8 and a number of planetary gears 10 held on a planetary carrier 11 additionally belong to the 2-gear transmission 4. Both speed levels of the 2-gear transmission 4 are engageable via two friction clutches 12 and 13. Both friction clutches 12 and 13 are conveniently arranged radially into each other with essentially an equal axial extension. Both friction clutches 12 and 13 are designed as spring-accumulator clutches whose discs 14 and 15 are compressed together by a compression spring 16 or 17 via a piston 18 or 20. Both friction clutches 12 and 13 are therefore engaged by spring tension.

Both friction clutches 12 and 13 are disengaged by an oil pressure generated by an oil pump 21. The oil pump 21 conveys the pressurized oil via a pressure line 22, a gear-shift valve 23 and two control lines 24 and 25 to a cylinder space 26 of the friction clutch 12 or a cylinder space 27 of the friction clutch 13. The pressurized oil is fed here from the control line 24 into the cylinder space 26 via a rotary supply through the input shaft 6. The pressurized oil is fed from the control line 25 into the cylinder space 27 via a static, that is, rigid and thus leakage-oil-free, supply directly from the housing 5 into the cylinder space 27.

The planetary carrier 11 is supported on a gear shaft 28 which for its part is supported in the housing 5. The gear shaft 28 carries a spur gear 30 that meshes with another spur gear 32 secured to an output shaft 31. The wheels, not shown, of the vehicle are driven via the output shaft 31.

Both spur gears 30 and 31 together form a spur-gear stage 33. Between the 2-gear transmission 4 and the spur-gear stage 33 is inserted a separating clutch 34 by which can shut off the communication between the 2-gear transmission 4 and the spur-gear stage 33.

The hydraulic motor 3 is supplied with oil from a hydraulic pump 35. In the embodiment of the drive device for a mobile excavator shown in the drawing, the hydraulic pump 35 together with the control component 2 are in the upper chassis while the drive component 1 with the hydraulic motor 3 and the 2-gear transmission 4 are situated in the lower chassis. When used in this manner, the hydraulic motor 3 is supplied with oil by the hydraulic pump 35 in an open circuit via two work lines 36 and 37. The oil conveyed by the hydraulic pump 35 is steered via a steering valve 38 to the work lines 36 and 37. The steering valve 38 can be directly or indirectly electromagnetically actuated via an electronic control unit 39. The control can be also hydraulic. The upper chassis and the lower chassis of the mobile excavator are interconnected via a rotary articulation 40 through which both control lines 24 and 25 and both work lines 36 and 37 are passed.

If the drive device is used for other construction machines, such as a wheeled loader, it is convenient to interconnect the hydraulic pump 35 and the hydraulic motor 3 by a close circuit, since in this case the hydraulic pump must supply only the traction-hydraulic motor.

Between the oil pump 21 and the gear-shift valve 23 consecutive construction elements are inserted in, or attached to, the pressure line 22: an accumulator-charge valve 41, a work line 42 with a hydraulic accumulator 43 for a service brake not shown, a hydraulic accumulator 44 for both friction clutches 12 and 13, a first pressure switch 45, a hand-brake valve 46 and a second pressure switch 47. Both pressure switches 45 and 47 are connected with the electronic control unit 39 via electric control lines 48 and 50. The supply of pressurized oil to the friction clutches 12, 13, can be regulatedly reduced by the hand-brake valve 46. The electronic control unit 39 and the pressure valve 45 and 47 comprise the pressure control means.

The gear-shift valve 23 is actuatable into its 2nd-gear position by the force of a compression spring 51, while its 1st-gear position is electromagnetically adjustable via the electronic control unit 39 and an electric control line 52.

The gear-shift valve 23 can be divided with equal effect into two separately controllable shift valves (FIGS. 2A and 2B) each one of which is coordinated with one of the friction clutches 12 and 13.

The operation of the drive device is described herebelow: When the vehicle is parked, both friction clutches 12 and 13 are engaged by the force of the compression springs 16 and 17. The gears of the 2-gear transmission 4 are thereby blocked. The device acts as parking brake.

To engage the 1st gear, the gear-shift valve 23 is adjusted to its 1st-gear position. Thereby pressurized oil is passed from the oil pump 21 through the pressure line 22 and the control line 24 into the cylinder space 26. The piston 18 is moved to the left against the force of the compression spring 16 so as to disengage the friction clutch 12. The 1st gear is engaged via the friction clutch 13 engaged by the force of the compression spring 17.

To engage the 2nd gear, the gear-shift valve 23 is adjusted to its 2nd-gear position by the force of the compression spring 51. Thereby the cylinder space 26 of the friction clutch 12 is vented so that the friction clutch 12 engages. The external friction clutch 13 is simultaneously disengaged by feeding pressurized oil to the cylinder space 27 via the control line 25. The further course of the transmission of force through the planetary transmission and the spur-gear stage 33 to the output shaft 31 is to be deduced from the drawing in an easily understandable manner.

When the oil pressure generated by the oil pump 21 falls below a first specific value, a signal fed via the electric control line 48 to the electronic control unit 39 is produced in the first pressure switch 45. Thereupon the gear-shift valve 23 is adjusted to its 2nd-gear position or held therein by the force of the compression spring 51. Since a drop of the oil pressure generated by the oil pump 21 often is related to the fact that no more sufficient pressurized oil is conveyed, said remaining residual amount of oil is fed to the cylinder space 27 of the external friction clutch 13. Since the oil is fed through the housing 5 directly, and thus leakage-oil-free, into the cylinder space 27, and since only a very small stroke of the piston 20 is needed to open the friction clutch 13, this device ensures the oil supply of the 2-gear transmission 4 for a specific period of time. Said ensured time interval can be precisely established by the arrangement of the hydraulic accumulator 44.

In case of failure of the electric control current needed for the gear-shift valve 23, the gear-shift valve 23 is adjusted to the 2nd-gear position by the force of the compression spring 51.

If separate shift valves are used instead of the gear-shift valve 23, (e.g. valves 23A, 23B in FIG. 2A or valves 23C and 23B in FIG. 2B) then in case of failure of the electric control current, the former are adjusted by the force of springs to their neutral position in which—depending on the switching arrangement chosen—all friction clutches are disengaged (valves 23A, 23B in FIG. 2A) or only one friction clutch is engaged (valves 23C, 23D in FIG. 2B). When all friction clutches are disengaged the vehicle can roll further. With only one friction clutch engaged, the vehicle can travel further in the corresponding gear.

If the oil pressure in the pressure line 22 downstream behind the handbrake valve 46 falls below a second specific value, lower than the first specific value, then the steering valve 38 is adjusted to its neutral shift position which shuts off the communication of the hydraulic pump 35 to the hydraulic motor 3. This is also the case, for instance, when the hand-brake valve 46 is actuated. Thereby it is ensured that no braking occurs against the drive of the hydrostatics.

Reference numerals 1 drive component
2 control component
3 hydraulic motor
4 2-gear transmission
5 housing
6 input shaft
7 sun gear
8 ring gear
9 -
10 planetary gear
11 planetary carrier
12 friction clutch
13 friction clutch
14 discs
15 discs 16 compression spring
17 compression spring
18 piston
19 -
20 piston
21 oil pump
22 pressure line
23 gear-shift valve
24 control line
25 control line
26 cylinder space
27 cylinder space
28 gear shaft
29 -
30 spur gear
31 output shaft
32 spur gear
33 spur-gear stage
34 separating clutch
35 hydraulic pump
36 work line
37 work line
38 steering valve
39 electronic control unit
40 rotary articulation
41 accumulator charge valve
42 work line
43 hydraulic accumulator
44 hydraulic accumulator
45 first pressure switch
46 hand-brake valve
47 second pressure switch
48 electric control line
49 -
50 electric control line
51 compression spring
52 electric control line

What is claimed is:

1. A drive device for one of a mobile excavator vehicle, a wheeled loader vehicle and a similar work vehicle, comprising:
a prime mover (3) driving a transmission (4) designed as power-shiftable planetary transmission having at least first and second shiftable gears;
the first and second shiftable gears of said transmission (4) being alternatively engageable and disengageable via first and second friction clutches (12, 13);
gear-shift valve means (23) connected to supply pressurized oil to said first and second friction clutches (12, 13) for controlling engagement and disengagement of said first and second friction clutches (12, 13);
said first and said second friction clutches (12, 13) being spring-accumulator clutches and being disengaged by oil pressure supplied by at least one oil pump (21) via an oil pressure line (22) and said gear shift valve means (23); and
at least said second friction clutch (13), and having a static leakage-oil-free oil supply;
wherein pressure control means (39, 45, 47) is provided for sensing the oil pressure in said oil pressure line (22) and controlling operation of said gear shift valve means (23), and when said pressure control means senses that the oil pressure generated by said at least one oil pump (21) falls below a first specific value, said pressure control means causes said gear-shift valve means (23) to adjust to a position in which said second friction clutch (13) is disengaged by the pressurized oil.

2. A drive device for one of a mobile excavator vehicle, a wheeled loader vehicle and a similar work vehicle, comprising:
a prime mover (3) driving a transmission (4) designed as power-shiftable planetary transmission having at least first and second shiftable gears;
the first and second shiftable gears of said transmission (4) being alternatively engageable and disengageable via first and second friction clutches (12, 13);
gear-shift valve means (23) connected to supply pressurized oil to said first and second friction clutches (12, 13) for controlling engagement and disengagement of said first and second friction clutches (12, 13);
said first and said second friction clutches (12, 13) being spring-accumulator clutches and being disengaged by oil pressure applied by at least one oil pump (21) via an oil pressure line (22) and said gear shift valve means (23);
one of said friction clutches (12) being supplied with pressurized oil via a rotary input shaft (6) of the transmission (4); and
at least said second friction clutch (13), having a static leakage-oil-free oil supply;
wherein pressure control means (39, 45, 47) is provided for sensing the oil pressure in said oil pressure line (22) and controlling operation of said gear shift valve means (23), and when said pressure control means senses that the oil pressure generated by said at least one oil pump (21) falls below a first specific value, said pressure control means causes said gear-shift valve means (23) to adjust to a position in which said second friction clutch (13) is disengaged by the pressurized oil and said first friction clutch (12) is engaged whereby one of the shiftable gears of said transmission (4) is engaged to facilitate further travel of the vehicle incorporating the drive device.

3. A drive device according to claim 1, wherein said pressure control means comprises a first pressure switch (45) attached to said oil pressure line (22), leading from said at least one oil pump (21) to said gear-shift valve means (23), for sensing the pressure in said oil pressure line (22), and when said first pressure switch (45) senses that the oil pressure falls below the first specific value, said pressure control means causes aid gear-shift valve means (23) to shifted to the position in which said second friction clutch (13) is disengaged by the pressurized oil.

4. A drive device according to claim 2, wherein a hydraulic accumulator (44) is attached to said oil pressure line (22).

5. A drive device according to claim 1, wherein said gear-shift valve means (23) includes at least one compression spring (51) and, in case of failure of an electric control current supplied by said pressure control means, said gear shift valve means is shifted, via said at least one compression spring, (51) to the position in which said second friction clutch (13) is disengaged by the pressurized oil.

6. A drive device according to claim 1, wherein a handbrake valve (46) is situated in said oil pressure line (22) leading from said at least one oil pump (21) to said gear-shift valve means by which the supply of pressurized oil to said first and second friction clutches (12, 13) can be regulated, and said pressure control means further comprises a pressure switch (47) attached to said oil pressure line (22) between said hand-brake valve (46) and said gear-shift valve means (23) and when said pressure switch (47) senses that the oil pressure falls below a second specific value, lower than the first specific value, said pressure control means controls a steering valve to disengage said prime mover (3) from drive.

7. A drive device according to claim 6, wherein said prime mover is a hydraulic motor (3) supplied with pressurized oil by a hydraulic pump (35) via said steering valve (38), and, when the oil pressure falls below said second specific value, said steering valve (38) is adjusted to a neutral shift position which shuts off oil communication between said hydraulic pump (35) and said hydraulic motor (3).

8. A drive device according to claim 6, wherein said prime mover is a hydraulic motor (3) supplied with pressurized oil by a hydraulic pump (35) and, when the oil pressure falls below said second specific value, said steering control means is adjusted to a neutral position so that said hydraulic motor cooperates in braking the vehicle.

9. A drive device according to claim 6, wherein said prime mover is a hydraulic motor (3) which is supplied with pressurized oil by a hydraulic pump (35) via said steering valve (38), and said gear-shift valve means (23) is divided into separate shift valves.

10. A drive device according to claim 9, wherein each one of said separate gear-shift valve controls one of said first and second friction clutches (12, 13) and, in case of failure of an electric control current of said pressure control means, said gear-shift valves are adjusted by springs force to engage only one of said first and second friction clutches.

11. A drive device for one of a mobile excavator, a wheeled loader and a similar work vehicle, comprising:

a prime mover (3) driving a transmission (4) designed as power-shiftable planetary transmission having at least first and second shiftable gears;

the first and second shiftable gears of said transmission (4) being alternatively engageable and disengageable via first and second friction clutches (12, 13);

gear-shift valve means (23) connected to supply pressurized oil to said first and second friction clutches (12, 13) for controlling engagement and disengagement of said first and second friction clutches (12, 13);

said first and second friction clutches (12, 13) being spring-accumulator clutches and being disengaged by oil pressure supplied by at least one oil pump (21) via an oil pressure line (22) and said gear shift valve means (23);

one of said friction clutches (12) being supplied with pressurized oil via a rotary input shaft (6) of the transmission (4); and at least said second friction clutch (13), having a static leakage-oil-free oil supply;

wherein pressure control means (39, 45, 47) is provided for sensing the oil pressure in said oil pressure line (22) and controlling operation of said gear shift valve means (23), and when said pressure control means senses that the oil pressure generated by said at least one oil pump (21) falls below a first specific value, said pressure control means causes said gear-shift valve means (23) to adjust to a position in which said second friction clutch (13) is disengaged by the pressurized oil;

said gear-shift valve means (23) is divided into separate shift valves, and each one of said separate gear-shift valve controls one of said first and second friction clutches (12, 13) and, in case of failure of an electric control current from said pressure control means, said gear-shift valves are adjusted by springs force to neutral positions in which both of said first and second friction clutches are disengaged.

12. The drive device according to claim 1, wherein in the event of a failure of an electrical control current supplied by said pressure control means to said gear shift valve, said gear shift valve means is adjusted by a biasing mechanism to disengage at least one of said first and second clutches to facilitate further travel of the vehicle.

13. The drive device according to claim 2, wherein in the event of a failure of an electrical control current supplied by said pressure control means to said gear shift valve, said gear shift valve means is adjusted by a biasing mechanism to disengage at least one of said first and second clutches to facilitate further travel of the vehicle.

* * * * *